United States Patent
Zheng

(10) Patent No.: US 11,523,281 B1
(45) Date of Patent: Dec. 6, 2022

(54) VALIDATING CUSTOMIZED USER EQUIPMENT (UE)

(71) Applicant: T-Mobile USA, Inc., Bellevue, WA (US)

(72) Inventor: Pei Zheng, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 64 days.

(21) Appl. No.: 17/239,504

(22) Filed: Apr. 23, 2021

(51) Int. Cl.
| | |
|---|---|
| *H04W 12/37* | (2021.01) |
| *H04W 12/30* | (2021.01) |
| *H04W 24/10* | (2009.01) |
| *H04W 24/02* | (2009.01) |
| *H04W 8/08* | (2009.01) |
| *H04W 48/18* | (2009.01) |

(52) U.S. Cl.
CPC ............ *H04W 12/35* (2021.01); *H04W 8/08* (2013.01); *H04W 12/37* (2021.01); *H04W 24/02* (2013.01); *H04W 24/10* (2013.01); *H04W 48/18* (2013.01)

(58) Field of Classification Search
CPC ....... H04W 12/35; H04W 8/08; H04W 12/37; H04W 24/02; H04W 24/10; H04W 48/18
See application file for complete search history.

(56) References Cited

U.S. PATENT DOCUMENTS

| | | | |
|---|---|---|---|
| 10,972,362 B2* | 4/2021 | Tang ................. | H04L 41/12 |
| 11,202,212 B2* | 12/2021 | Karanam .......... | H04W 36/14 |
| 2006/0259629 A1* | 11/2006 | Usmani ............ | H04W 24/08 |
| | | | 709/227 |
| 2010/0192212 A1* | 7/2010 | Raleigh ............ | H04L 9/3247 |
| | | | 726/7 |
| 2011/0067116 A1* | 3/2011 | Lu .................... | H04W 12/08 |
| | | | 726/29 |
| 2013/0132854 A1* | 5/2013 | Raleigh ............ | G06F 3/0482 |
| | | | 715/738 |
| 2018/0146418 A1* | 5/2018 | Sharma ............ | H04W 48/16 |

* cited by examiner

*Primary Examiner* — Julio R Perez

(57) ABSTRACT

Solutions for validating a customized user equipment (UE), prior to permitting the UE to register on a cellular network, include: receiving a set of requirement queries into a validation tool, the set of requirement queries including at least one software application identification, at least one user interface (UI) configuration, and at least one network connectivity configuration; receiving a set of requirements into the validation tool, the set of requirements corresponding with the set of requirement queries; receiving, from a customization tool on the UE, UE configuration information corresponding with the set of requirement queries; determining whether the UE configuration information meets the set of requirements; based on at least the UE configuration information meeting the set of requirements, generating a validation report for the UE; and transmitting the validation report over a network. This may require installing and configuring the customization tool on the UE to collect the configuration information.

20 Claims, 5 Drawing Sheets

VALIDATING CUSTOMIZED USER EQUIPMENT (UE)

BACKGROUND

Prior to permitting a new model or version of a user equipment (UE) from an original equipment manufacturer (OEM) provider onto a cellular network, the cellular carrier validates that the UE is properly configured for the network. This may include ensuring that the UE is configured with the proper access point name (APN), domain name system (DNS) identification, message server name, and other network access parameters. Additionally, the OEMs typically customize UEs for different cellular carriers, such as with specified icons, icon placement, background screens (e.g., wallpaper), and/or ringtones. Further, in order to protect the integrity and performance of the networks, cellular carriers may limit some UE software, such as operating systems (OSs), email and messaging applications, and internet browsers to versions that have been determined to be safe.

In some scenarios, a cellular carrier may host UEs from approximately twenty OEMs, spanning about fifty different device types, running a hundred different versions of major software. Certification is critical to manage features, performance, and quality of UEs, and ensures OEMs follow cellular carriers' requirements for software, such as correct customizations of pre-loaded applications, configurations of network parameters on the UE, and configurations of wallpaper, ringtones, home screen layout, and the user interface. The scale of the necessary validation operation (for certification) is huge, and is prone to delays, gaps (due to scheduling and resource constraints), and human error. Unfortunately, a single error or gap in the validation operation may have significant negative consequences for a cellular network and large numbers of a cellular carrier's customers.

SUMMARY

The following summary is provided to illustrate examples disclosed herein, but is not meant to limit all examples to any particular configuration or sequence of operations.

Solutions for validating a customized user equipment (UE), prior to permitting the UE to register on a cellular network, include: receiving a set of requirement queries into a validation tool, the set of requirement queries including at least one software application identification, at least one user interface (UI) configuration, and at least one network connectivity configuration; receiving a set of requirements into the validation tool, the set of requirements corresponding with the set of requirement queries; receiving, from a customization tool on the UE, UE configuration information corresponding with the set of requirement queries; determining whether the UE configuration information meets the set of requirements; based on at least the UE configuration information meeting the set of requirements, generating a validation report for the UE; and transmitting the validation report over a network. This may require installing and configuring the customization tool on the UE to collect the configuration information.

BRIEF DESCRIPTION OF THE DRAWINGS

The disclosed examples are described below with reference to the accompanying drawing figures listed below, wherein.

Figure 1:
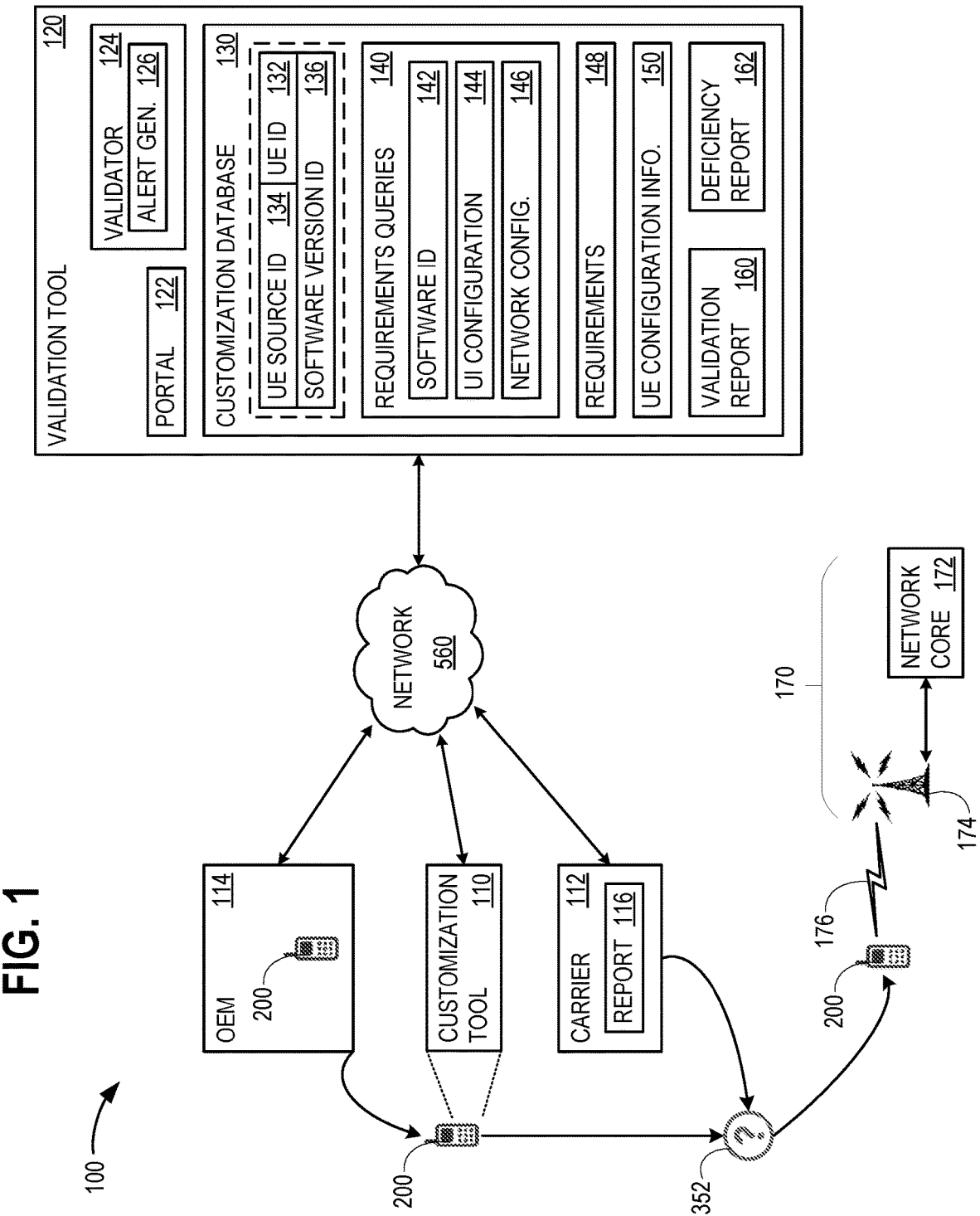
FIG. 1 illustrates an exemplary arrangement that advantageously improves validation of customized user equipment (UE)

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions for validating a customized user equipment (UE), prior to permitting the UE to register on a cellular network, include: receiving a set of requirement queries into a validation tool, the set of requirement queries including at least one software application identification, at least one user interface (UI) configuration, and at least one network connectivity configuration; receiving a set of requirements into the validation tool, the set of requirements corresponding with the set of requirement queries; receiving, from a customization tool on the UE, UE configuration information corresponding with the set of requirement queries; determining whether the UE configuration information meets the set of requirements; based on at least the UE configuration information meeting the set of requirements, generating a validation report for the UE; and transmitting the validation report over a network. This may require installing and configuring the customization tool on the UE to collect the configuration information.

Aspects of the disclosure improve the operation of cellular communications by determining whether UE configuration information meets a set of requirements in a manner that is more rapid and accurate than when performed manually. This reduces the risk of gaps and human error, thereby improving the reliability of cellular networks. Further, aspects of the disclosure provide more rapid validation, significantly reducing the time and cost of certifying a new UE model for operation on a cellular network. Thus, the advantageously improved validation of a customized UE is flexible and efficient. Some examples may leverage a cloud service to expedite UE certification.

Figure 2:
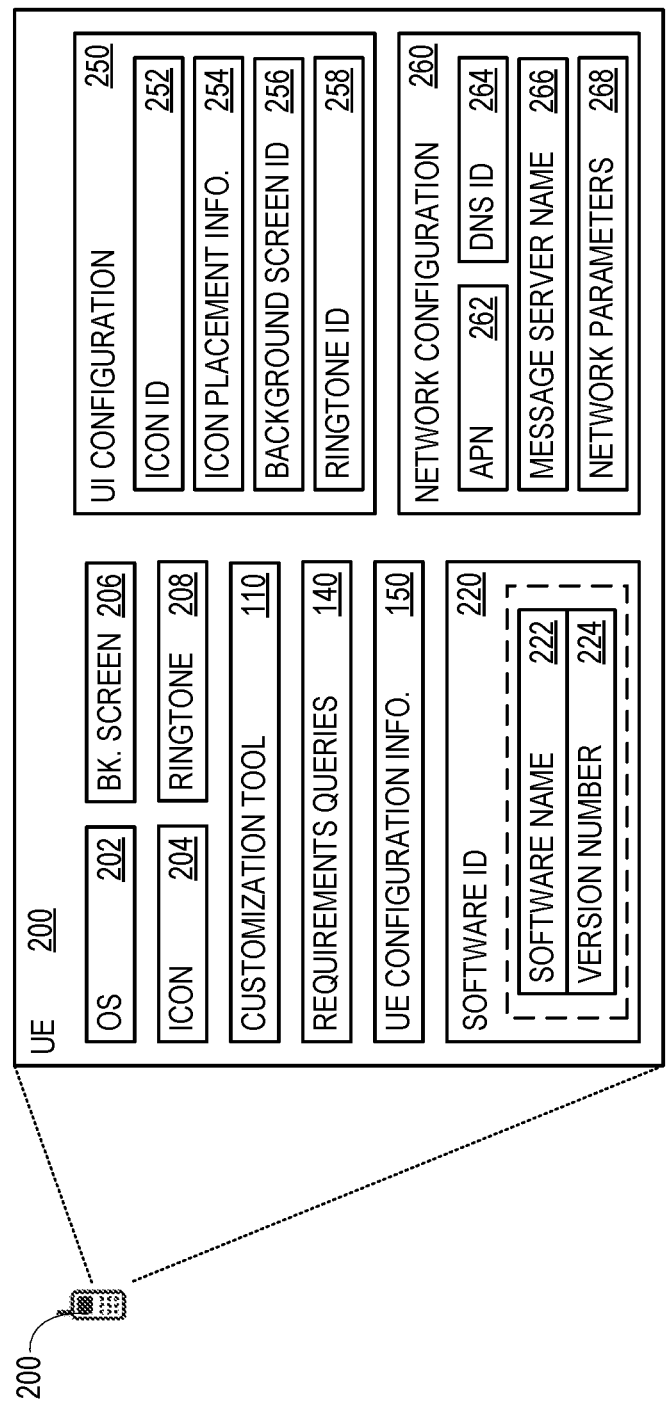
FIG. 2 illustrates further detail for components of the arrangement of FIG. 1.

FIG. 1 illustrates an exemplary arrangement 100 that advantageously improves validation of a customized UE 200, and FIG. 2 illustrates further detail for UE 200. In FIG. 1, a customization tool 110 is leveraged by cellular carrier 112 to quickly and accurately determine whether UE 200 should be permitted onto (e.g., to register on) a network 170. Network 170 comprises a cellular network comprising a network core 172 and a radio access network (RAN) 174. If permitted to register on network 170, UE 200 uses an air interface 176 to communicate with RAN 174. In some examples, network 170 includes fourth generation (4G) cellular network functionality, fifth generation (5G) cellular network functionality, and/or another generation of cellular network functionality.

In arrangement 100, an original equipment manufacturer (OEM) 114 builds and configures UE 200 in a customized manner to meet the specifications of cellular carrier 112. UE 200 executes customization tool 110 to produce UE configuration information 150, which is provided to a validation tool 120. Validation tool 120 generates a report 116, which is used by cellular carrier 112 in a decision operation 352 (described in relation to FIG. 3) to either certify UE 200 for operation on network 170 (and thus permitting UE 200 onto network 170), or sending UE 200 back to OEM 114 to correct the configuration of UE 200.

Figure 5:
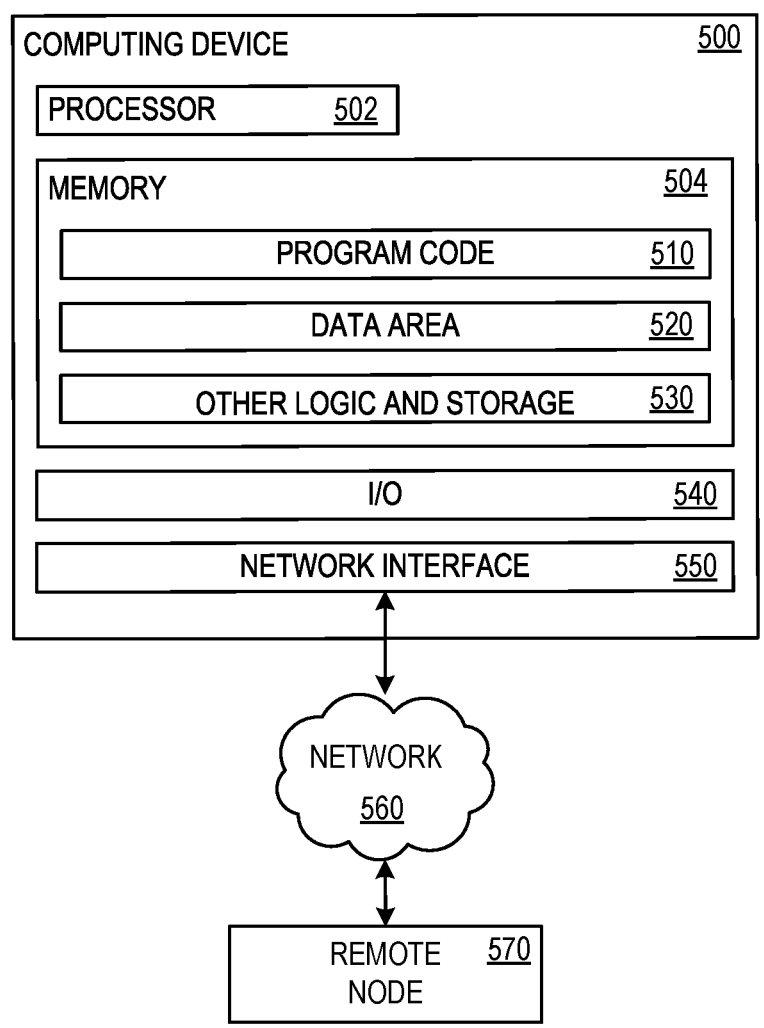
FIG. 5 illustrates a block diagram of a computing device suitable for implementing various aspects of the disclosure.

In some validation tool 120 is provided as a cloud resource, and is reached via a network 560, which may include the internet and is described in further detail in relation to FIG. 5. Validation tool 120 comprises a web portal 122, for communicating over network 560, a requirement validator 124, and a customization database 130. Requirement validator 124 generates report 116, which may be either a validation report 160 or a deficiency report 162, and includes an alert generator 126 that informs cellular carrier 112 (and also, in some examples, OEM 114) when report 116 is ready. Customization database 130 stores information that is produced by cellular carrier 112, customization tool 110, and requirement validator 124, and consumed by cellular carrier 112 and OEM 114. The illustrated contents of customization database 130 are described in reference to FIG. 2 and also in reference to FIG. 3, which describes the operation of arrangement 100.

Turning to FIG. 2, additional detail is provided for UE 200. In some examples, UE 200 comprises a cellular device, suitable for operation on network 170. UE 200 comprises an operating system (OS) 202, and has at least one icon 204 for display and selection by a user, graphical information for a background screen 206 (e.g., wallpaper), and an installed ringtone 208. Customization tool 110 uses set of requirement queries 140 to collect UE configuration information 150, and transmits UE configuration information 150 to requirement validator 124. Set of requirement queries 140 specifies the information that customization tool 110 is to collect from UE 200. In some examples, OS 202 provides query functionality that is accessed by customization tool 110, and provides UE configuration information 150. With this arrangement, a common customization tool 110 may be used to collect different information from different UEs, by tailoring set of requirement queries 140 to the specific information that is desired.

A software application identifier (ID) 220 specifies a major software component of UE, such as OS 202 or other software functionality on UE 200 (e.g., software components of a radio protocol stack). Software application ID 220 includes a software name 222 (which may be numeric) and a software version number 224. Although only a single software application ID 220 is illustrated, it should be understood that UE 200 may have a software application ID 220 for each software component. UI configuration 250 has information relevant to what may be observed by a user of UE 200, such as icon 204, background screen 206, and ringtone 208. For examples, an icon ID 252 identifies icon 204 (e.g., by name or some numerical value), icon placement information 254 specifies the location of icon 204 on a screen of UE 200, a background screen ID 256 identifies background screen 206 (e.g., by name or some numerical value), and a ringtone ID 258 identifies ringtone 208 (e.g., by name or some numerical value). Additional information may also be included in UI configuration 250.

Network configuration 260 has information that is used by UE to connect with and interact with network 170. For examples, an access point name (APN) 262 identifies an access point in network 170, a domain name system (DNS) ID 264 identifies a DNS for UE 200, a message server name 266 identifies a message server in network 170 for UE 200 to use (e.g., for short message service (SMS) messages), and network parameters 268 identify other parameters for UE 200 to use when connecting to network 170. Additional information may also be included in network configuration 260.

Figure 3:
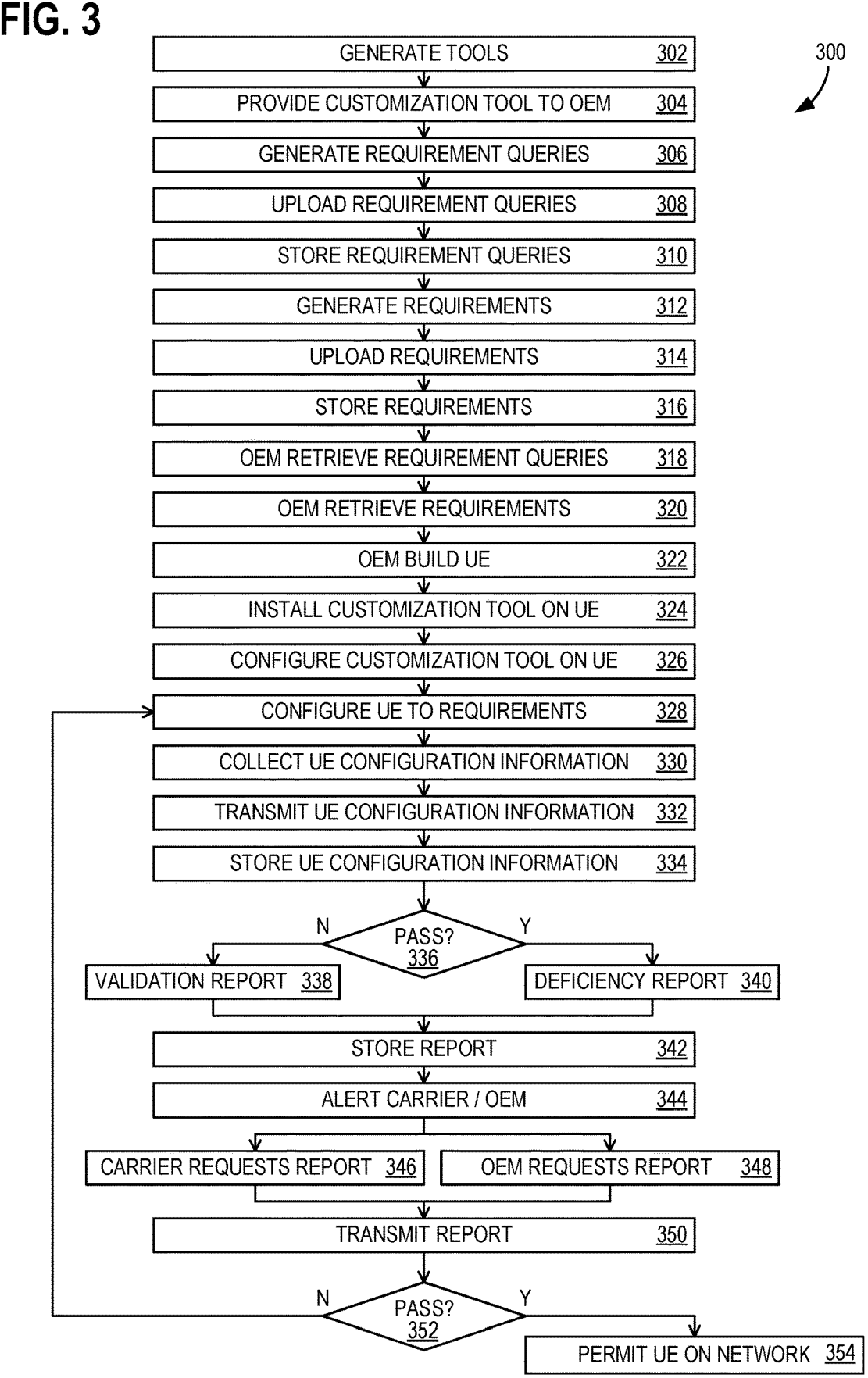
FIG. 3 illustrates a flowchart of exemplary operations that may be associated with validating a customized UE in examples of the arrangement of FIG. 1.

FIG. 3 illustrates a flowchart 300 of exemplary operations that may be associated with validating a customized UE in examples of the arrangement of FIG. 1. In some examples, at least a portion of flowchart 300 may be performed using one or more computing devices 500 of FIG. 5. Cellular carrier 112 generates customization tool 110 and validation tool 120 in operation 302. In some examples, validation tool 120 comprises web portal 122 and requirement validator 124, and in some examples, validation tool 120 further comprises customization database 130. Cellular carrier 112 provides customization tool 110 to OEM 114 at 306.

Cellular carrier 112 generates set of requirement queries 140 in operation 306, and uploads set of requirement queries 140 to validation tool 120 in operation 308. Operation 308 includes receiving set of requirement queries 140 into validation tool 120. Set of requirement queries 140 includes at least one software application identification 142, at least one UI configuration 144, and at least one network connectivity configuration 146. Software application identification 142 in set of requirement queries 140 instructs customization tool 110 to collect software application ID 220 into UE configuration information 150. UI configuration 144 in set of requirement queries 140 instructs customization tool 110 to collect UI configuration 250 into UE configuration information 150. Network connectivity configuration 146 in set of requirement queries 140 instructs customization tool 110 to collect network configuration 260 into UE configuration information 150. In some examples, receiving set of requirement queries 140 into validation tool 120 comprises receiving set of requirement queries 140 through web portal 122.

In some examples, software application identification 142 comprises a software identifier and a software version (instructing customization tool 110 to collect software name 222 and software version number 224 of software application ID 220). In some examples, UI configuration 144 comprises at least one configuration item selected from the list consisting of: icon placement information, a background screen identification, and a ringtone identification. This instructs customization tool 110 to collect one or more of: icon ID 252, icon placement information 254, background screen ID 256, and ringtone ID 258. In some examples, network connectivity configuration 146 comprises at least one configuration item selected from the list consisting of: an APN, a DNS ID, a message server name, and a network access parameter set. This instructs customization tool 110 to collect one or more of: APN 262, DNS ID 264, message server name 266, and network parameters 268.

Operation 310 includes storing set of requirement queries 140 in customization database 130. In some example, validation tool 120 stores set of requirement queries 140 associated with (e.g., indexed by) a UE identifier 132 (e.g., by name or model number), a UE source identifier 134 (e.g., identifying OEM 114), and software version ID 136 (e.g., software application ID 220). Cellular carrier generates set of requirements 148 for UE 200 in operation 312. Set of requirements 148 corresponds with set of requirement queries 140, so that when customization tool 110 uses set of requirement queries 140 to obtain UE configuration information 150 from UE 200, requirement validator 124 has sufficiently complete information to determine whether UE configuration information 150 meets set of requirements 148 (as described below, for decision operation 336). Cellular carrier 112 uploads set of requirements 148 for UE 200 to validation tool 120 at 314. Operation 314 includes receiving set of requirements 148 into validation tool 120. In some examples, receiving set of requirements 148 into validation tool 120 comprises receiving set of requirement queries 140 through web portal 122. Operation 316 includes storing set of requirements 148 in customization database 130. In some examples, validation tool 120 stores set of requirements 148 associated with UE identifier 132 and the UE source identifier 134.

OEM 114 retrieves a copy of set of requirement queries 140 through web portal 122 at 318, so that OEM 114 may properly configure customization tool 110 to collect the information needed in UE configuration information 150. OEM 114 retrieves a copy of set of requirements 148 through web portal 122, so that OEM 114 may properly configure UE 200 to satisfy set of requirements 148 (at 328, below). OEM 114 builds UE 200 in operation 322 and installs customization tool 110 on UE 200 at 324. In operation 326, OEM 114 configures customization tool 110 on UE 200 to collect UE configuration information 150. In some examples, this may be relatively simple, such as by copying set of requirement queries 140 onto UE 200. I some examples, cellular carrier 112 or another entity installs and configures customization tool 110 on UE 200.

At 328, OEM 114 configures UE 200 according to set of requirements 148, or corrects the configuration of UE 200, if flowchart 300 enters operation 328 as a result of failing certification in decision operation 352 below. Operation 330 includes collecting, by customization tool 110 on UE 200, UE configuration information 150. Customization tool 110 may collect information on preloaded applications and their version numbers; UI layer information, such as icon placement and ringtone; and network connectivity information such as APN, DNS, message server name, and network parameters. Operation 332 includes transmitting, by customization tool 110 on UE 200, UE configuration information 150 to validation tool 120. Operation 332 also includes receiving, from customization tool 110 on UE 200, UE configuration information 150. Operation 334 includes storing UE configuration information 150 in customization database 130. In some examples, validation tool 120 stores UE configuration information 150 associated with UE identifier 132 and UE source identifier 134.

Decision operation 336 determines whether UE configuration information 150 meets set of requirements 148. If so, in operation 338, based on at least UE configuration information 150 meeting set of requirements 148, requirement validator 124 generates validation report 160 for UE 200. If not, in operation 340, based on at least UE configuration information 150 not meeting set of requirements 148, requirement validator 124 generates deficiency report 162 for UE 200. In some examples, deficiency report 162 identifies the specific requirements within set of requirements 148 that are not met. This detail will enable OEM 114 to correct the configuration of UE 200, if flowchart 300 returns to operation 328.

Operation 342 includes storing validation report 160 or deficiency report 162 (whichever was generated) in customization database 130. In some examples, validation tool 120 stores validation report 160 or deficiency report 162 associated with UE identifier 132 and UE source identifier 134. Validation tool 120 alerts cellular carrier 112 and/or OEM 114 that a report is ready, in operation 344. Cellular carrier 112 requests a copy of the report at 346, and OEM 114 requests a copy of the report at 348.

Operation 350 includes transmitting validation report 160 or deficiency report 162 (whichever was generated) over network 560. The transmitted report (validation report 160 or deficiency report 162) becomes report 116. In some examples, transmitting validation report 160 comprises transmitting validation report 160 based on at least receiving a request (e.g., at 346 or 348), by validation tool 120, for validation report 160. In some examples, transmitting deficiency report 162 comprises transmitting deficiency report 162 based on at least receiving a request (e.g., at 346 or 348), by validation tool 120, for deficiency report 162.

Cellular carrier 112 determines whether to certify UE 200 for operation on network 170 in decision operation 352, based on at least UE configuration information 150 meeting set of requirements 148 (e.g., as reported in validation report 160). Operation 354 includes, based on at least UE configuration information 150 meeting set of requirements 148, registering UE 200 on network 170 (e.g., cellular network 170). In this situation, cellular carrier 112 sells UE 200 and/or permits multiple ones of UE 200 onto network 170. Otherwise, if UE fails certification (e.g., deficiency report 162 reports that UE configuration information 150 does not meet set of requirements 148), flowchart 300 returns to operation 328, in which OEM 114 corrects the customized configuration of UE 200.

Figure 4:
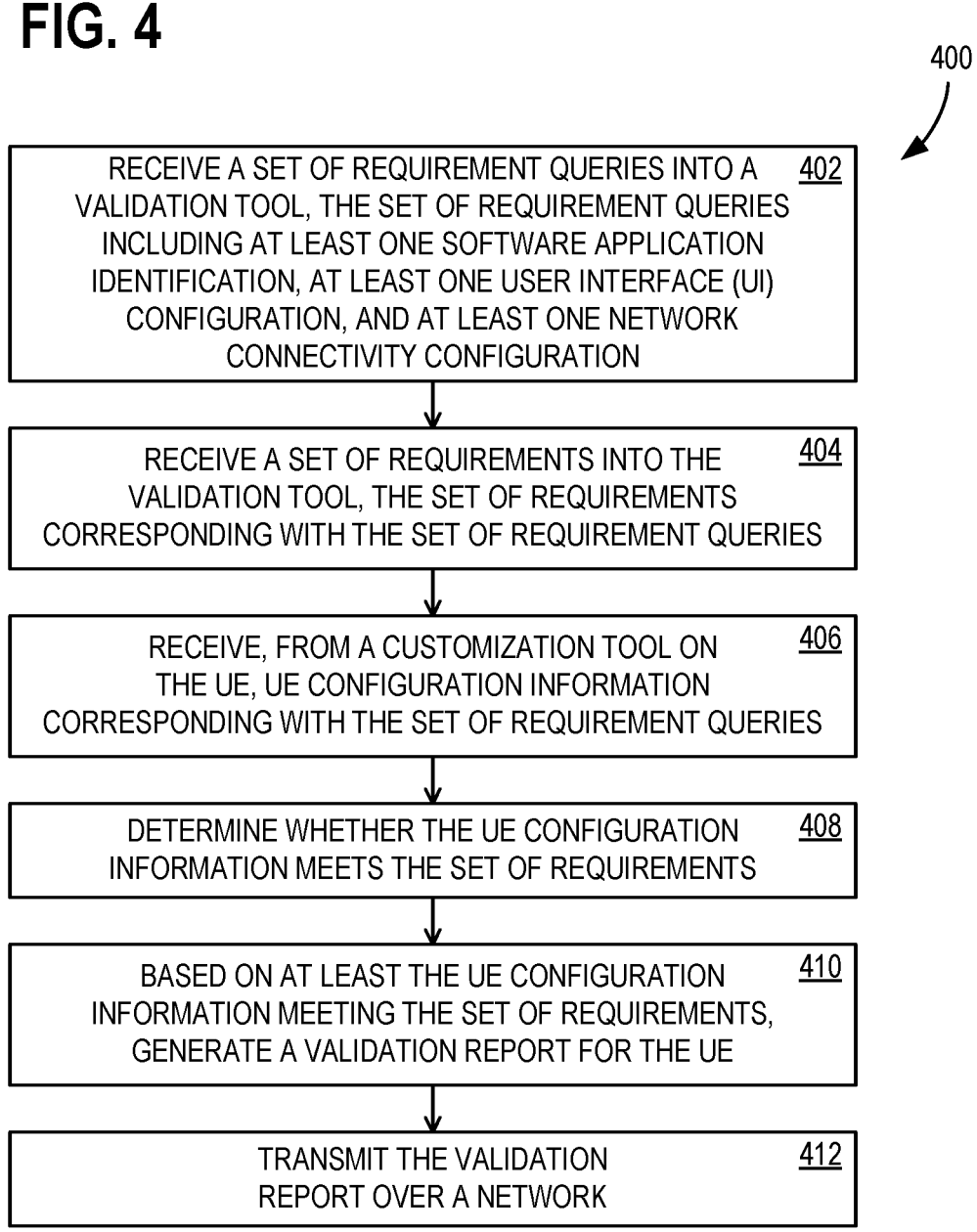
FIG. 4 illustrates another flowchart of exemplary operations that may be associated with validating a customized UE in examples of the arrangement of FIG. 1.

FIG. 4 illustrates a flowchart 400 of exemplary operations that may be associated with validating a customized UE in examples of the arrangement of FIG. 1. In some examples, at least a portion of flowchart 400 may be performed using one or more computing devices 500 of FIG. 5. Operation 402 includes receiving a set of requirement queries into a validation tool, the set of requirement queries including at least one software application identification, at least one UI configuration, and at least one network connectivity configuration. Operation 404 receiving a set of requirements into the validation tool, the set of requirements corresponding with the set of requirement queries. Operation 406 receiving, from a customization tool on the UE, UE configuration information corresponding with the set of requirement queries. Operation 408 determining whether the UE configuration information meets the set of requirements. Operation 410 based on at least the UE configuration information meeting the set of requirements, generating a validation report for the UE. Operation 412 transmitting the validation report over a network.

FIG. 5 illustrates a block diagram of computing device 500 that may be used as a component of arrangement 100, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500.

Additional Examples

An example method of validating a customized UE comprises: receiving a set of requirement queries into a validation tool, the set of requirement queries including at least one software application identification, at least one UI configuration, and at least one network connectivity configuration; receiving a set of requirements into the validation tool, the set of requirements corresponding with the set of requirement queries; receiving, from a customization tool on the UE, UE configuration information corresponding with the set of requirement queries; determining whether the UE configuration information meets the set of requirements; based on at least the UE configuration information meeting the set of requirements, generating a validation report for the UE; and transmitting the validation report over a network.

An example system for validating a customized UE comprises: a processor; and a computer-readable medium storing instructions that are operative upon execution by the processor to: receive a set of requirement queries into a validation tool, the set of requirement queries including at least one software application identification, at least one UI configuration, and at least one network connectivity configuration; receive a set of requirements into the validation tool, the set of requirements corresponding with the set of requirement queries; receive, from a customization tool on the UE, UE configuration information corresponding with the set of requirement queries; determine whether the UE configuration information meets the set of requirements; based on at least the UE configuration information meeting the set of requirements, generate a validation report for the UE; and transmit the validation report over a network;

One or more example computer storage devices has computer-executable instructions stored thereon, which, upon execution by a computer, cause the computer to perform operations comprising: receiving a set of requirement queries for a customized UE into a validation tool, the set of requirement queries including at least one software application identification, at least one UI configuration, and at least one network connectivity configuration; receiving a set of requirements into the validation tool, the set of requirements corresponding with the set of requirement queries; receiving, from a customization tool on the UE, the UE configuration information corresponding with the set of requirement queries; determining whether the UE configuration information meets the set of requirements; based on at least the UE configuration information meeting the set of requirements, generating a validation report for the UE; and transmitting the validation report over a network.

Alternatively, or in addition to the other examples described herein, examples include any combination of the following:
- based on at least the UE configuration information meeting the set of requirements, registering the UE on a cellular network;
- installing the customization tool on the UE;
- configuring the customization tool on the UE to collect the UE configuration information;
- collecting, by the customization tool on the UE, the UE configuration information;
- based on at least the UE configuration information not meeting the set of requirements, generating a deficiency report for the UE;
- transmitting the deficiency report over the network;
- the UI configuration comprises at least one configuration item selected from the list consisting of: icon placement information, a background screen identification, and a ringtone identification;
- the network connectivity configuration comprises at least one configuration item selected from the list consisting of: an APN, a DNS identification, a message server name, and a network access parameter set;
- storing, by the validation tool, the set of requirement queries associated with a UE identifier and a UE source identifier;
- storing, by the validation tool, the set of requirement queries associated with a UE identifier;
- transmitting the validation report comprises transmitting the validation report based on at least receiving a request, by the validation tool, for the validation report;
- the software application identification comprises a software identifier and a software version;
- receiving the set of requirement queries into the validation tool comprises receiving the set of requirement queries through a web portal;
- storing the set of requirement queries in a customization database;
- receiving the set of requirements into the validation tool comprises receiving the set of requirement queries through the web portal;
- storing the set of requirements in the customization database;
- storing, by the validation tool, the set of requirements associated with the UE identifier and the UE source identifier;
- retrieving a copy of the set of requirement queries through the web portal;
- retrieving a copy of the set of requirements through the web portal;
- transmitting, by the customization tool on the UE, the UE configuration information to the validation tool;
- storing the UE configuration information in the customization database;
- storing, by the validation tool, the UE configuration information associated with the UE identifier and the UE source identifier;
- storing the validation report in the customization database;
- storing, by the validation tool, the validation report associated with the UE identifier and the UE source identifier;
- storing, by the validation tool, the deficiency report associated with the UE identifier and the UE source identifier;
- transmitting the deficiency report comprises transmitting the deficiency report based on at least receiving a request, by the validation tool, for the deficiency report;
- storing the deficiency report in the customization database;
- the validation tool comprises the web portal and the requirement validator; and
- the validation tool further comprises the customization database.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of validating a customized user equipment (UE), the method comprising:
   receiving a set of requirement queries into a validation tool, the set of requirement queries including at least one software application identification, at least one user interface (UI) configuration, and at least one network connectivity configuration;
   receiving a set of requirements into the validation tool, the set of requirements corresponding with the set of requirement queries;
   receiving, from a customization tool on the UE, UE configuration information corresponding with the set of requirement queries;
   determining whether the UE configuration information meets the set of requirements;
   based on at least the UE configuration information meeting the set of requirements, generating a validation report for the UE; and
   transmitting the validation report over a network.

2. The method of claim 1, further comprising:
   based on at least the UE configuration information meeting the set of requirements, registering the UE on a cellular network.

3. The method of claim 1, further comprising:
   installing the customization tool on the UE;
   configuring the customization tool on the UE to collect the UE configuration information; and
   collecting, by the customization tool on the UE, the UE configuration information.

4. The method of claim 1, further comprising:
   based on at least the UE configuration information not meeting the set of requirements, generating a deficiency report for the UE; and
   transmitting the deficiency report over the network.

5. The method of claim 1, wherein the UI configuration comprises at least one configuration item selected from the list consisting of:
   icon placement information, a background screen identification, and a ringtone identification.

6. The method of claim 1, wherein the network connectivity configuration comprises at least one configuration item selected from the list consisting of:
   an access point name (APN), a domain name system (DNS) identification, a message server name, and a network access parameter set.

7. The method of claim 1, further comprising:
   storing, by the validation tool, the set of requirement queries associated with a UE identifier and a UE source identifier.

8. A system for validating a customized user equipment (UE), the system comprising:
   a processor; and
   a computer-readable medium storing instructions that are operative upon execution by the processor to:
      receive a set of requirement queries into a validation tool, the set of requirement queries including at least one software application identification, at least one user interface (UI) configuration, and at least one network connectivity configuration;
      receive a set of requirements into the validation tool, the set of requirements corresponding with the set of requirement queries;
      receive, from a customization tool on the UE, UE configuration information corresponding with the set of requirement queries;
      determine whether the UE configuration information meets the set of requirements;
      based on at least the UE configuration information meeting the set of requirements, generate a validation report for the UE; and
      transmit the validation report over a network.

9. The system of claim 8, wherein the operations are further operative to:
   install the customization tool on the UE;
   configure the customization tool on the UE to collect the UE configuration information; and
   collect, by the customization tool on the UE, the UE configuration information.

10. The system of claim 8, wherein the operations are further operative to:
    based on at least the UE configuration information not meeting the set of requirements, generate a deficiency report for the UE; and
    transmit the deficiency report over the network.

11. The system of claim 8, wherein the UI configuration comprises at least one configuration item selected from the list consisting of:
    icon placement information, a background screen identification, and a ringtone identification.

12. The system of claim 8, wherein the network connectivity configuration comprises at least one configuration item selected from the list consisting of:
    an access point name (APN), a domain name system (DNS) identification, a message server name, and a network access parameter set.

13. The system of claim 8, wherein the operations are further operative to:
    store, by the validation tool, the set of requirement queries associated with a UE identifier.

14. The system of claim 8, wherein transmitting the validation report comprises transmitting the validation report based on at least receiving a request, by the validation tool, for the validation report.

15. One or more computer storage devices having computer-executable instructions stored thereon, which, upon execution by a computer, cause the computer to perform operations comprising:

receiving a set of requirement queries for a customized user equipment (UE) into a validation tool, the set of requirement queries including at least one software application identification, at least one user interface (UI) configuration, and at least one network connectivity configuration;

receiving a set of requirements into the validation tool, the set of requirements corresponding with the set of requirement queries;

receiving, from a customization tool on the UE, the UE configuration information corresponding with the set of requirement queries;

determining whether the UE configuration information meets the set of requirements;

based on at least the UE configuration information meeting the set of requirements, generating a validation report for the UE; and transmitting the validation report over a network.

16. The one or more computer storage devices of claim 15, wherein the operations further comprise:

installing the customization tool on the UE;

configuring the customization tool on the UE to collect the UE configuration information; and collecting, by the customization tool on the UE, the UE configuration information.

17. The one or more computer storage devices of claim 15, wherein the operations further comprise:

based on at least the UE configuration information not meeting the set of requirements, generating a deficiency report for the UE; and transmitting the deficiency report over the network.

18. The one or more computer storage devices of claim 15, wherein the UI configuration comprises at least one configuration item selected from the list consisting of:

icon placement information, a background screen identification, and a ringtone identification.

19. The one or more computer storage devices of claim 15, wherein the network connectivity configuration comprises at least one configuration item selected from the list consisting of:

an access point name (APN), a domain name system (DNS) identification, a message server name, and a network access parameter set.

20. The one or more computer storage devices of claim 15, wherein the operations further comprise:

storing, by the validation tool, the set of requirement queries associated with a UE identifier and a UE source identifier.

* * * * *